US011876787B2

(12) United States Patent
Ries et al.

(10) Patent No.: US 11,876,787 B2
(45) Date of Patent: Jan. 16, 2024

(54) DYNAMIC ENCRYPTED COMMUNICATIONS SYSTEMS USING ENCRYPTION ALGORITHM HOPPING

(71) Applicant: RENent LLC, Livermore, CA (US)

(72) Inventors: Richard G. Ries, Livermore, CA (US); Ellen M. Mason, Livermore, CA (US); Nathanael J. Ries, Livermore, CA (US)

( * ) Notice: Subject to any disclaimer, the term of this patent is extended or adjusted under 35 U.S.C. 154(b) by 224 days.

(21) Appl. No.: 17/485,389

(22) Filed: Sep. 25, 2021

(65) Prior Publication Data

US 2023/0099688 A1 Mar. 30, 2023

(51) Int. Cl.
*H04L 9/40* (2022.01)
*G06F 21/60* (2013.01)
*G06F 21/76* (2013.01)
*H04L 9/08* (2006.01)
*G06F 13/42* (2006.01)
*H04L 7/00* (2006.01)
*H04B 1/713* (2011.01)
*H04B 10/70* (2013.01)
*H04W 12/03* (2021.01)

(52) U.S. Cl.
CPC ...... *H04L 63/0428* (2013.01); *G06F 13/4282* (2013.01); *G06F 21/602* (2013.01); *G06F 21/76* (2013.01); *H04B 1/713* (2013.01); *H04B 10/70* (2013.01); *H04L 7/0008* (2013.01); *H04L 9/0852* (2013.01); *H04L 63/18* (2013.01); *H04W 12/03* (2021.01); *G06F 2213/0016* (2013.01)

(58) Field of Classification Search
CPC ... H04L 63/0428; H04L 63/18; H04L 9/0852; G06F 21/602; G06F 21/76; G06F 2213/0016; H04W 12/03
USPC ........................................................ 713/150
See application file for complete search history.

(56) References Cited

U.S. PATENT DOCUMENTS

| 2,292,387 | A | 8/1942 | Kiesler et al. | |
|---|---|---|---|---|
| 8,127,130 | B2 * | 2/2012 | Ellis ..................... | H04L 9/0662 713/151 |
| 8,886,959 | B2 * | 11/2014 | Goto ....................... | G06F 21/72 380/28 |
| 11,126,356 | B2 * | 9/2021 | Van Duyne ............. | H04L 9/088 |
| 2003/0204738 | A1 * | 10/2003 | Morgan ............... | H04L 63/0853 713/194 |
| 2004/0073796 | A1 * | 4/2004 | Kang .................... | H04W 12/04 713/171 |
| 2006/0126827 | A1 * | 6/2006 | Milleville ............. | H04L 9/3236 380/28 |
| 2007/0255941 | A1 * | 11/2007 | Ellis ..................... | H04L 9/0662 713/151 |

(Continued)

Primary Examiner — Samson B Lemma
(74) Attorney, Agent, or Firm — CrossPond Law

(57) ABSTRACT

An apparatus for providing secure communications may include a processor; memory in electronic communication with the processor; an output in electronic communication with the processor; and instructions stored in the memory and executable by the processor to cause the apparatus to store a plurality of encryption protocols; store at least one encryption hopping protocol; select at least one encryption hopping protocol; encrypt the data according to the selected encryption hopping protocol; and transmit data from the output utilizing the selected encryption hopping protocol.

20 Claims, 6 Drawing Sheets

(56) References Cited

U.S. PATENT DOCUMENTS

| | | | |
|---|---|---|---|
| 2013/0024691 A1* | 1/2013 | Chowdhury | H04L 63/12 |
| | | | 713/168 |
| 2013/0064372 A1 | 3/2013 | Delport et al. | |
| 2020/0092079 A1* | 3/2020 | Bayley | H04L 9/0656 |
| 2020/0092728 A1* | 3/2020 | Van Duyne | H04L 9/0891 |
| 2021/0377008 A1* | 12/2021 | Chien | H04L 9/3297 |
| 2023/0251786 A1* | 8/2023 | Van Duyne | H04L 9/065 |
| | | | 713/193 |

* cited by examiner

G4/G5 Cellular Network

Bluetooth Network

Ship to Shore, Plane and Space Station Communications

DYNAMIC ENCRYPTED COMMUNICATIONS SYSTEMS USING ENCRYPTION ALGORITHM HOPPING

FIELD OF THE INVENTION

This invention relates to encrypted communications, and more particularly to secure communications using multiple hardware and/or software encryption algorithms.

BACKGROUND

There is a broad need for communications security across a wide variety of situations, users and industries. Generally, encryption is used in the transfer of information over the Internet for security and commerce; for example, personal information must be encrypted between a user and the website of that user's bank, to protect the user's money and personal information. As another example, two people separated from one another may wish to communicate personal and private information without fear of outside entities intercepting those communications, such as by using messaging applications on their smartphones. The needs for privacy and security are fundamental human needs, and human rights as well.

In the context of communication, encryption is generally performed by a transmitter, which may be hardware or software. That transmitter encrypts the data to be transmitted, and then transmits that encrypted data to a receiving device. The receiving device then decrypts the encrypted data. The receiver performs that decryption based on the particular encryption protocol used. For example, the encryption protocol may be a private key/public key encryption protocol, and the transmitter may possess the public key and the receiver may possess the private key. Traditional encryption technologies known in the art rely on such keys to encrypt and decrypt transmitted data, and render that unusable without the key(s). The data, however, remains subject to attack.

When any encryption protocol is cracked, a new encryption protocol must be selected or created. For hardware encryption, this usually requires a part replacement, or a redesign of the product. For software encryption, this usually requires a redesign of the software with new encryption/decryption algorithms, including a user and device update. Both of these options are expensive and time-consuming, and leave the user without a way to communicate securely in the meantime. History demonstrates that all single encryption methods will eventually fail, no matter how difficult the encryption is or number of bits/bytes used, whether through the use of more clever solutions, the increase in computing power available for brute force solutions, or the advent of new kinds of computers. The advent of quantum computing potentially threatens current encryption methods that rely on hard mathematical problems to encrypt data. The technical problem at the heart of modern cryptography is thus the susceptibility to attack of encryption protocols used for secure communications—particularly today, when practical quantum computing is on the horizon.

Another way in which communications can be made more secure is spread-spectrum technology. Such technology was pioneered during World War II by actress and inventor Hedy Lamarr (Markey) and her co-inventor George Antheil, for use in securely communicating with a remote-control torpedo. A part of a complete message is transmitted on a first channel, then another part is transmitted on a second channel, and so on. Such spread-spectrum technology is the basis for modern technology such as the BLUETOOTH® wireless protocol (Bluetooth SIG, Kirkland, Washington) and the WI-FI® wireless protocol (Wi-Fi Alliance, Austin, Texas). Because spread-spectrum technology is so well-known, it is not particularly secure today, and is utilized more for efficient use of spectrum than for security.

The use of wireless technologies for communication between humans via machines, or for machine-to-machine communications, creates new classes of problems that need to be solved, particularly for machines intended to last for years or decades. A subset of such problems relate to establishing secure communications between machines in a manner that can be secured over a relatively long operating lifetime of a machine, which may be 10 years or longer. Existing solutions to the problem of establishing secure communications between machines may not be efficient or feasible for such applications, because the machines engaged in communications may be unattended, operating remotely, and/or traveling geographically or globally.

Thus, there exists a need for secure communication that does not rely solely on an encryption technique to provide that security.

SUMMARY OF THE INVENTION

In view of at least one of the aforementioned technical problems, one or more embodiments of the invention utilize various schemes for encryption hopping with different encryption protocols. Such hopping does not in itself prevent encrypted transmissions from being hacked or broken, but does complicate any attacks on those transmissions and render them more cost-prohibitive and time-consuming. As a result, such hacking becomes impractical, and/or the amount of time a product can be on market or be installed without encryption updates can be extended. This method of encryption hopping may be used by computers, networks, network communications, WiFi or any electronic communications between 2 or more devices, in both hardware and software. This includes, but is not limited to, mobile devices from cars to wearable devices, smart watches, cell phones and cell phone applications, space and military applications.

An apparatus for providing secure communications may include a processor; memory in electronic communication with the processor; an output in electronic communication with the processor; and instructions stored in the memory and executable by the processor to cause the apparatus to store a plurality of encryption protocols; store at least one encryption hopping protocol; select at least one encryption hopping protocol; encrypt the data according to the at least one selected encryption hopping protocol; and transmit data from the output utilizing the at least one selected encryption hopping protocol.

A method for secure communication of data between two or more devices may include storing a plurality of encryption protocols; storing at least one encryption hopping protocol; selecting at least one encryption hopping protocol; encrypting data according to the selected encryption hopping protocol; and transmitting data from one device to at least one other device utilizing the selected encryption hopping protocol.

A non-transitory computer-readable medium storing code for performing encryption hopping may include instructions executable by a processor to store a plurality of encryption protocols; store at least one encryption hopping protocol; select at least one encryption hopping protocol; receive data to be encrypted; encrypt the data according to the selected encryption hopping protocol; and transmit data utilizing the selected encryption hopping protocol.

BRIEF DESCRIPTION OF THE DRAWINGS

The use of the same reference symbols in different figures indicates similar or identical items.

DETAILED DESCRIPTION OF THE INVENTION

Figure 1:
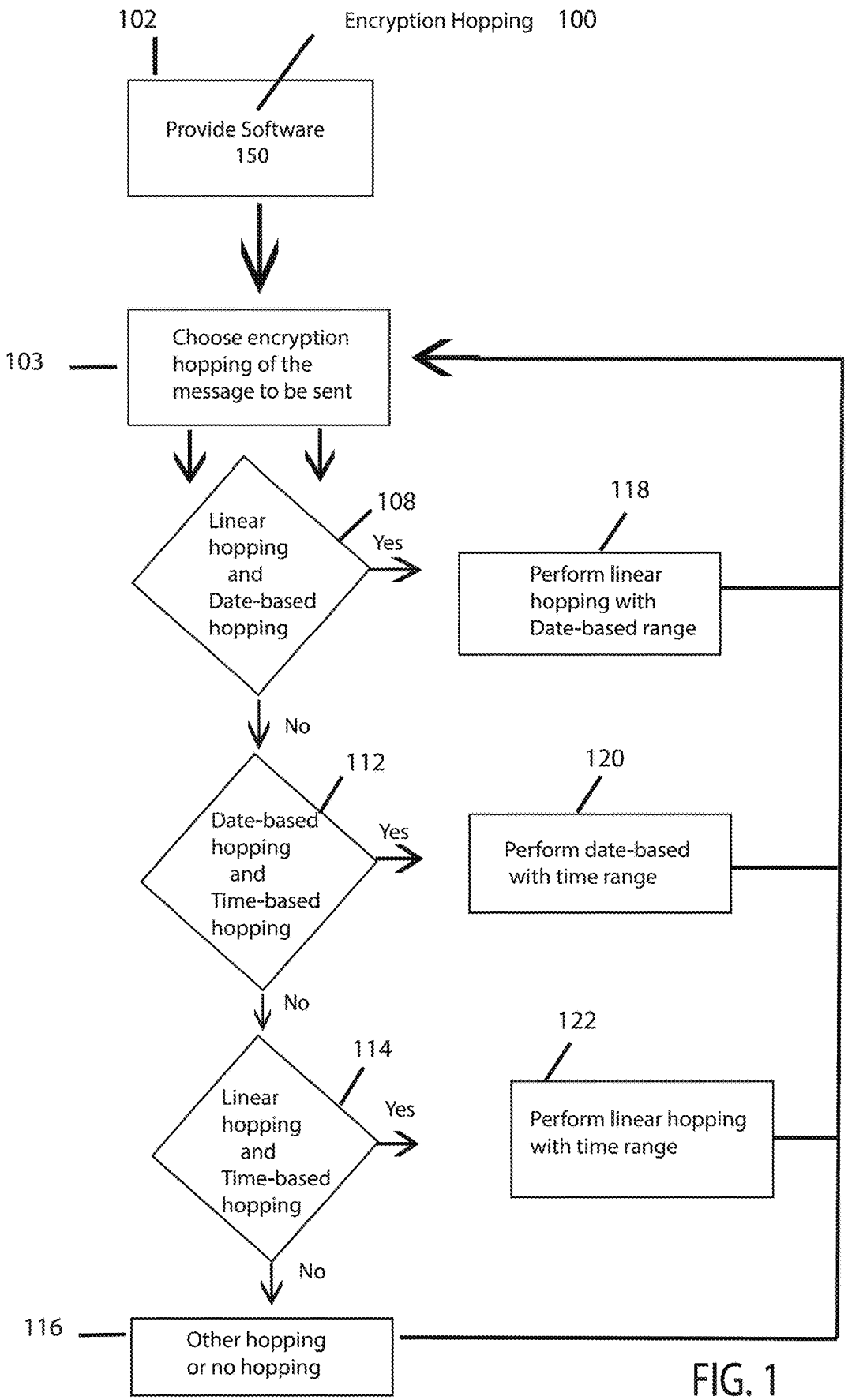
FIG. 1 is an exemplary flowchart describing an encryption hopping process.

Referring to FIG. 1, an exemplary flowchart describing an encryption hopping process 100 is shown. In box 102, encryption hopping software 150 may be provided. Any suitable computer or machine language may be used to implement the process 100 in software, such as but not limited to CAN, SPI, i2c, PHP, Java, C, C++, assembly, Hardware Description Language (HDL) or Verilog (syntactically similar to C language). As used in this document, the term "encryption hopping" is defined to mean changing the encryption protocol used in secure communication between two or more devices based on one or more criteria known to the devices. An "encryption hopping protocol" is an instruction set that controls the changing of the encryption protocols used in secure communication between two or more devices.

The encryption hopping software 150 may include at least two different encryption protocols. Alternately, the encryption hopping software 150 has access to at least two different encryption protocols stored in the device 210 or outside the device 210. In this document, a particular encryption protocol is referred to as Case X, where X is an integer greater than zero. For example, the transmitter 200 may store three different encryption protocols as Case 0, Case 1, and Case 2.

Cryptographic systems can be divided into two categories. Symmetric cryptography (such as the Advanced Encryption Standard or AES) is often used for message encryption. Asymmetric cryptography (such as RSA) is the basis for public key cryptography, and relies on difficult mathematical problems (factoring prime numbers is most common). Asymmetric cryptography is widely used for signatures and key exchanges to secure communications and networks such as email exchanges, virtual private networks (VPNs), and secure webpage connections. One or more of the encryption protocols included in the encryption hopping software 150 may be asymmetric. Alternately, none of the encryption protocols included in the encryption hopping software 150 are asymmetric.

Examples of symmetric cryptographic protocols include, for example, the Advanced Encryption Standard (AES), the Data Encryption Standard (DES), Triple Data Encryption Standard (3DES), RC4, Blowfish, Twofish, QUAD, and Serpent. Examples of asymmetric cryptographic protocols include Rivest-Shamir-Adleman (RSA), Diffie-Hellman, elliptic-curve cryptography (ECC), ElGamal, and Digital Signature Algorithm (DSA). One or more of the encryption protocols stored included in the encryption hopping software 150 may be symmetric. Alternately, none of the encryption protocols included in the encryption hopping software 150 are symmetric.

The encryption protocols included in the encryption hopping software 150, and used by the encryption hopping software 150 in the course of the process 100, may be any of those set forth above, and/or may be any other suitable encryption protocol.

Figure 2:
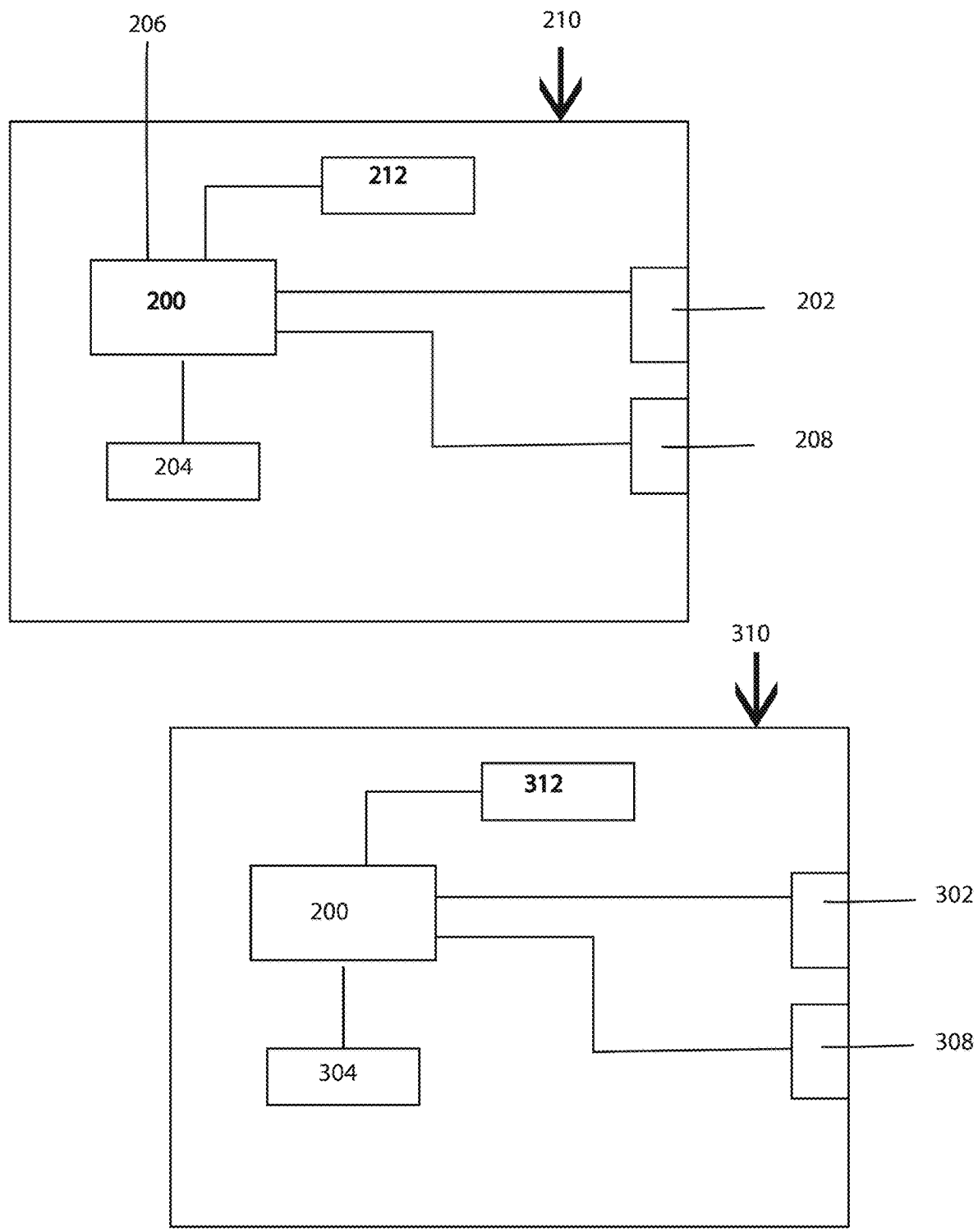
FIG. 2 is a schematic view of a transmitting device and a receiving device.

Referring also to FIG. 2, that encryption hopping software 150 runs on a device 210, which may be a mobile device such as a smartphone, cell phone, smart watch, wearable device, tablet, automobile, other motor vehicle, aircraft or spacecraft. The device 210 also may be a generally-stationary device, such as a desktop computer, or a transceiver fixedly mounted to a telephone pole or other infrastructure. The encryption hopping software 150 may be an app installed on a smartphone, smart watch, tablet or other device. The device 210 may include, or be connected to, a memory 212 that stores the encryption hopping software 200, and a processor unit 206 connected to the memory 212 that executes the instructions contained in the encryption hopping software 200.

According to some embodiments, the device 210 may be a standalone device. In other embodiments, the device 210 may be a component in a larger device, such as a computer peripheral card connected to a network bus. The device 210 may be configured to send encrypted data to an output 202; the processor unit 206 loads the encryption hopping software 150 from the memory 212, executes the instructions contained in the encryption hopping software 200, and outputs encrypted data to the output 202. The output 202 transmits encrypted data to a receiver 300. The output 202 may transmit encrypted data in any suitable manner. As one example, where the output 202 is an antenna, the output 202 may transmit encrypted data via radio waves or another part of the RF spectrum, and/or may transmit encrypted data using the WI-FI® wireless protocol or BLUETOOTH® wireless protocol. As another example, where the output 202 is a physical connector such as an Ethernet port, the output 202 may transmit encrypted data through a wired connection to a wired network. The output 202 may include a photon generator for use in quantum key distribution (QKD). Such a photon generator is configured to generate one or more photons used to communicate a quantum state from the device 210 to the receiver 300. The photon generator may be a laser, laser diode (LD), injection laser diode (ILD), diode laser, light-emitting diode (LED), or any other suitable semiconductor, optoelectronic, or other device capable of generating one or more photons usable to communicate a quantum state. The output 202 may be any hardware that is used to transmit data outward from the device 210 to the receiver 300. The device 210 also may include an input 208 that may receive encrypted data from the receiver 300.

The device 210 may include, or be connected to, a clock 204. The clock 204 provides time data to the device 210. The clock 204 may be a standard real-time clock (RTC) integrated circuit. Alternately, the clock 204 may be any other digital or analog component that provides time data. Where the clock 204 is external to the device 210, that clock 204 may be the National Atomic Clock operated by the National Institute of Standards and Technology, which broadcasts radio signals providing the correct time to users, and which also provides an online web interface via the Internet that provides the correct time to users. The clock 204 need not keep time in standard human notation, and instead may measure time in other ways, such as number of oscillations since power-on.

The encryption hopping software 150 also may run on a receiving device 310, which may be a mobile device such as a smartphone, cell phone, smart watch, wearable device, tablet, automobile, other motor vehicle, aircraft or spacecraft. The device 210 also may be a generally-stationary device, such as a desktop computer, or a transceiver fixedly mounted to a telephone pole or other infrastructure. The encryption hopping software 150 may be an app installed on a smartphone, smart watch, tablet or other device. The receiving device 310 may include, or be connected to, a memory 312 that stores the encryption hopping software 200, and a processor unit 306 connected to the memory 312 that executes the instructions contained in the encryption hopping software 200. The encryption hopping software 150 in the receiving device 310 may be the same software as in the device 210, or may be different software with reduced, expanded, or different functionality. It will be appreciated that in the context of communications, the device 210 and the receiver 300 may be considered to be interchangeable by those skilled in the art, because data is transmitted back and forth between them.

According to some embodiments, the receiving device 310 may be a standalone device. In other embodiments, the receiving device 310 may be a component in a larger device, such as a computer peripheral card connected to a network bus. The receiving device 310 may include an input 308 that may receive encrypted data from the transmitting device 210. The input 308 directs such encrypted data to the processor unit 306, which executes the instructions contained in the encryption hopping software 200, and decrypts the encrypted data received from the input 308. The receiving device 310 may be configured to send encrypted data to an output 302; the processor unit 306 loads the encryption hopping software 150 from the memory 312, executes the instructions contained in the encryption hopping software 200, and outputs encrypted data to the output 302. The output 302 transmits encrypted data to the transmitting device 210. The output 302 may transmit encrypted data in any suitable manner. As one example, where the output 302 is an antenna, the output 302 may transmit encrypted data via radio waves or another part of the RF spectrum, and/or may transmit encrypted data using the WI-FI® wireless protocol or BLUETOOTH® wireless protocol. As another example, where the output 302 is a physical connector such as an Ethernet port, the output 302 may transmit encrypted data through a wired connection to a wired network. The output 302 may be any hardware that is used to transmit data outward from the receiving device 310 to the transmitting device 210.

The receiving device 310 may include, or be connected to, a clock 304. The clock 304 provides time data to the receiving device 310. The clock 304 may be a standard real-time clock (RTC) integrated circuit. Alternately, the clock 304 may be any other digital or analog component that provides time data. Where the clock 304 is external to the receiving device 310, that clock 304 may be the National Atomic Clock operated by the National Institute of Standards and Technology, which broadcasts radio signals providing the correct time to users, and which also provides an online web interface via the Internet that provides the correct time to users. The clock 304 need not keep time in standard human notation, and instead may measure time in other ways, such as number of oscillations since power-on.

Referring also to FIG. 1, the process 100 moves from box 102 to box 103. In box 103, the encryption hopping software 150 chooses the type of encryption hopping to use for transmission and reception of encrypted data. According to other embodiments, a user may choose the type of encryption hopping himself or herself. The process 100 moves from box 103 to diamond 108. If the encryption hopping software 150 chooses a combination of linear hopping and date-based hopping, the process moves to box 118. If not, the process 100 moves to diamond 112.

In box 118, the encryption hopping software 150 performs linear hopping in combination with date-based hopping. As used in this document, the term "linear hopping" is defined to mean encryption hopping by using a different encryption protocol for each message than in a previous message. The term "message" may refer to any communication, whether a single bit of data, a packet of data, a text message, an email, or any size of data transmitted and/or received. The previous message may be the previous message sent from the encryption hopping software 150 (referred to as "transmission-based linear hopping"), or the previous message received by the encryption hopping software 150 (referred to as "reception-based linear hopping"). The previous message need not be the immediately previous message. As one example, where transmission-based linear hopping is used, the encryption hopping software 150 transmits a first message utilizing a Case 0 encryption protocol. At a later time, whether or not the encryption hopping software 150 has received a message back in response to the first message, the encryption hopping software 150 transmits a second message, and that second message is encoded utilizing a Case 1 encryption protocol. The "later time" may be almost instantly, as in microseconds later or less, or may be spaced apart further in time, such as by seconds, minutes, hours, days, weeks, months or years. At a still later time, whether or not the encryption hopping software 150 has received a message back in response to the first message, the encryption hopping software 150 transmits a third message, and that second message is encoded utilizing a Case 2 encryption protocol. Each successive message transmitted by the encryption hopping software 150 is encrypted with a different encryption protocol, until the number of messages sent by the encryption hopping software 150 equals the number of encryption protocols included in or accessible by the encryption hopping software 200. After that, the encryption hopping software 150 begins again by encrypting the next message with Case 0. As an example, where the encryption hopping software 150 stores three different encryption protocols Case 0, Case 1 and Case 2, the first message is encrypted utilizing Case 0, the second message is encrypted utilizing Case 1, the third message is encrypted utilizing Case 2, and the fourth message returns to Case 0 and is encrypted utilizing Case 0.

As another example, where transmission-based linear hopping is used, the encryption hopping software 150 transmits a first message utilizing a Case 0 encryption protocol. At a later time, the encryption hopping software 150 receives a message utilizing the next encryption protocol, the Case 1 encryption protocol. The "later time" may be almost instantly, as in microseconds later or less, or may be spaced apart further in time, such as by seconds, minutes, hours, days, weeks, months or years. At a later time, whether or not the encryption hopping software 150 has received a message back in response to the first message, the encryption hopping software 150 transmits another message, and that message is encoded utilizing a Case 2 encryption protocol. Each successive message transmitted by the encryption hopping software 150 is encrypted with a different encryption protocol than the message it previously received, until the number of messages sent and received by the encryption hopping software 150 equals the number of encryption protocols included in or accessible by the encryption hopping software 200. As an example, where the encryption hopping software 150 includes three different encryption protocols Case 0, Case 1 and Case 2, the first message sent by the encryption hopping software 150 is encrypted utilizing Case 0, the next message received by the encryption hopping software 150 is encrypted utilizing Case 1, the next message sent by the encryption hopping software 150 is encrypted utilizing Case 3, and the next message received by the encryption hopping software 150 returns to Case 0 and is encrypted utilizing Case 0.

As used in this document, the term "date-based hopping" is defined to mean encryption hopping on a schedule that utilizes the date on which the message is sent. The schedule may be calendar-based, where the encryption protocol used by the encryption hopping software 150 and receiver 300 on a particular date is based on the calendar date of message transmission and reception. As one example, where the encryption hopping software 150 includes or stores three different encryption protocols Case 0, Case 1 and Case 2, the encryption hopping software 150 may utilize encryption protocol Case 0 for a particular set of dates one or more times in a calendar year, such as from January 1 to January 24, March 1 to May 1, and November 11 to December 5, all in calendar year 2021; the other encryption protocols Case 1 and Case 2 are utilized during other calendar ranges in 2021. Those date ranges may be referred to as "encryption periods." The encryption hopping software 150 may determine the date by communicating with the clock 204. In this example, the date is Jan. 5, 2021, and the clock 204 communicates that date to the encryption hopping software 200. Because the date of Jan. 5, 2021 falls within the range of Jan. 1 to Jan. 24, 2021, the encryption hopping software 150 encrypts the outgoing message utilizing Case 0. Similarly, upon receipt of the message, the receiver 300 determines the date by communicating with its clock 304, and the result of that determination is Jan. 5, 2021, such that the receiver 300 decrypts the incoming message utilizing Case 0.

Both the encryption hopping software 150 and receiver 300 may be set to the same time zone, to avoid confusion as to the date that should be used for selecting the decryption protocol. Alternately, one of the encryption hopping software 150 and receiver 300 may store the difference in time zone, and use that difference to adjust the date communicated from the clock 204 such that the encryption hopping software 150 and receiver 300 can communicate properly.

In situations where the date is close to changing to the successive date, such as a few seconds prior to midnight, the receiver 300 may receive the message on the following date, and that following date may fall within the next successive encryption period, whether in actuality or due to clock drift and/or a slight lack of time synchronization between the clock 204 used by the encryption hopping software 150 and the clock 304 used by the receiver 300. Consequently, decryption of the message may fail, because the receiver 300 attempts to decrypt the message with an encryption protocol that is different from the one used to encrypt the message. Thus, in box 110, if decryption fails within a short period of time after midnight, the receiver 300 may attempt to decrypt the message again using the immediately previous encryption protocol. That short period of time after midnight may be referred to as the "margin of error time period." Referring back the example above, the encryption hopping software 150 may transmit the message on Jan. 24, 2021, within several microseconds of midnight; it encrypts the message utilizing Case 0. In this example, the receiver 300 receives the message on Jan. 25, 2021, a few seconds after midnight. As a result, the receiver 300 attempts to decrypt the message using Case 1, and consequently decryption of the message that was encrypted using Case 0 fails. The receiver 300 then attempts to decrypt the message using Case 0, which was the encryption protocol that was used immediately previously. That decryption with Case 0 succeeds. Optionally, the receiver 300 communicates to the encryption hopping software 150 that an adjustment in decryption protocol within the margin-of-error time period was performed. This transmission may be the local time and date at the receiver 300 itself. Such communication may be used to trigger synchronization between the encryption hopping software 150 and receiver 300.

Whether triggered by such communication, performed on a regular schedule, or otherwise commanded to do so, the encryption hopping software 150 and receiver 300 may synchronize to ensure accurate communication when date-based hopping is performed. One or more standard methods of clock synchronization may be utilized, such as but not limited to the Network Time Protocol (NTP).

Date-based hopping may use a schedule that is successive-range-based, where the encryption protocol used by the encryption hopping software 150 and receiver 300 on a particular date is based on stored periods of time, not on a calendar date of message transmission and reception. As one example, where the encryption hopping software 150 includes or stores three different encryption protocols Case 0, Case 1 and Case 2, the encryption hopping software 150 may utilize encryption protocol Case 0 for a period of seven days from transmission of its first message, Case 1 for a period of seven days after that, and Case 2 for a period of three days after that. When the time period utilizing the last encryption protocol stored by the transmitter 200 expires, the encryption hopping software 150 returns to Case 0 for the encryption protocol for the next time period.

When date-based hopping is performed using a successive-range-based schedule, time periods used in the schedule may vary over time, from a period of one day to a period that may extend across weeks, months or longer. Further, when date-based hopping is performed using a successive-range-based schedule, the change from one time period to the next need not occur at midnight. Rather, that change may be at a fixed time other than midnight, or may be based on an external event such as the time the first message was transmitted. Additionally, according to other embodiments, the time at which the change from one time period to the next may be altered over time, such as by the receipt of an external command, or by a stored instruction to alter the time of change to the next time period.

The schedule for date-based hopping may be preset, and included or stored in both the encryption hopping software 150, in the device 210 and receiver 300. According to other embodiments, the schedule may be changed one or more times based on instructions transmitted to both the encryption hopping software 150 and receiver 300. According to other embodiments, at least part of the schedule is not stored and the encryption hopping software 150 and/or receiver 300, and the schedule instead may be transmitted to the encryption hopping software 150 and/or receiver 300 from an external source.

The combination of linear hopping and date-based hopping provides additional security. Linear hopping is performed in box 118, through a range of dates on a schedule, as described above. As one example, at the beginning of a date range in which encryption protocol Case 2 is to be used, a flag is set that is associated with Case 2, and messages transmitted and received while that flag is set are encrypted and decrypted utilizing Case 2. As another example, before encrypting or decrypting a packet, message or other quantity of data, the date is checked, and the encryption protocol to be used in that date range is utilized. The process 100 then moves to box 103. If the combination of linear hopping and date-based hopping was not chosen by the encryption hopping software 200, the process 100 moves to diamond 112 as described above.

In diamond 112, if the encryption hopping software 150 chooses a combination of date-based hopping and time-based hopping, the process moves to box 120. If not, the process moves to diamond 114.

Turning to box 120, as used in this document, the term "time-based hopping" is defined to mean encryption hopping on a schedule that utilizes the time on which the message is sent. According to some embodiments, the schedule may be successive-range-based, where the encryption protocol used by the encryption hopping software 150 and receiver 300 is based on stored periods of time, not on a particular time stored by the clock. The stored periods of time may be any measurable periods of time, such as ranges measured in picoseconds or nanoseconds to ranges measured in hours, days, weeks, months or years. As one example, where the encryption hopping software 150 includes or stores three different encryption protocols Case 0, Case 1 and Case 2, the encryption hopping software 150 may utilize encryption protocol Case 0 for a period of ten microseconds from transmission of its first message, Case 1 for a period of 17 seconds after that, and Case 2 for a period of 2 seconds after that. When the period utilizing the last encryption protocol stored by the transmitter 200 expires, the encryption hopping software 150 returns to Case 0 for the encryption protocol for the next time period. In each successive time period, a encryption protocol is utilized that is different from the one utilized in the previous time period.

According to some embodiments, the encryption hopping software 150 may be included within the first device 210, and the receiver 300 may be included within a second device. Those two devices may be capable of being paired, such as through BLUETOOTH® technology. If so, the starting time from which the stored periods of time are measured may be the time when those two device are paired.

According to other embodiments, the schedule may be clock-based, where the encryption protocol used by the encryption hopping software 150 and receiver 300 at a particular time is based on the clock time message transmission and reception. As one example, where the encryption hopping software 150 includes or stores three different encryption protocols Case 0, Case 1 and Case 2, the encryption hopping software 150 may utilize encryption protocol Case 0 for a particular set of times, such as from 12:01:00-12:00:02 am, from 1:01:30-2:30:35 am, and from 11:05:05 am-3:45:02 pm; the other encryption protocols Case 1 and Case 2 may be utilized during other times of the day. Those time ranges may be referred to as "encryption periods." Optionally, those time ranges may vary based on the date or on the specific day of the week. In box 114, the encryption hopping software 150 determines the time by communicating with the clock 204. In this example, the time is 1:35:42 am, and the clock 204 communicates that date to the transmitter 200. Because the time of 1:35:42 am falls within the range of 1:01:30-2:30:35 am, the encryption hopping software 150 encrypts the outgoing message utilizing Case 0. Similarly, upon receipt of the message, the receiver 300 determines the date by electronically communicating with the clock 304, and the result of that determination is Jan. 5, 2021, such that the receiver 300 decrypts the incoming message utilizing Case 0.

As described above with regard to box 118, a margin of error time period may need to be considered for time-based hopping when the encryption periods are short, and/or when a time for switching between encryption protocols is approaching. As set forth above, in order to compensate, the receiver 300 may fall back to the immediately-previous encryption protocol if the encryption protocol it is attempting to use fails, and/or the receiver 300 may send the transmitter a request for synchronization.

Whether triggered by such communication, performed on a regular schedule, or otherwise commanded to do so, the encryption hopping software 150 in the device 210 and the receiver 300 may synchronize to ensure accurate communication when time-based hopping is performed. One or more standard methods of clock synchronization may be utilized, such as but not limited to the Network Time Protocol (NTP).

The combination of date-based hopping and time-based hopping provides additional security. In box 120, the date and time are determined, and an encryption protocol is chosen based on the time of encryption or decryption of data on a particular date. A lookup table or other database may be used to store the encryption protocols used during particular time ranges on each date, and a specific encryption protocol is selected for encrypting and decrypting data received during that time range.

As another example, the time-based hopping interacts with the particular date to determine the encryption protocol to be used. For example, during a particular time range, the schedule for time-based hopping may utilize encryption protocol Case 1; if that time range occurs on a Monday, or an odd-numbered date, or a date having some other property, the encryption protocol utilized may shift upward or downward one number or by more than one number, such as to Case 2. As another example, on a particular date, the schedule for date-based hopping may utilize encryption protocol Case 2; if the time a message is sent or received falls within a particular range, the encryption protocol utilized may shift upward or downward one number or by more than one number, such as to Case 4. The process 100 then moves to box 103. If the combination of date-based hopping and time-based hopping was not chosen by the encryption hopping software 200, the process 100 moves to diamond 114 as described above.

In diamond 114, if the encryption hopping software 150 chooses a combination of linear hopping and time-based hopping, the process moves to box 122. If not, the process moves to box 116.

The combination of linear hopping and time-based hopping provides additional security. Linear hopping is performed in box 122, through a range of times on a schedule, as described above. As one example, at the beginning of a time range in which encryption protocol Case 0 is to be used, a flag is set that is associated with Case 0, and messages transmitted and received while that flag is set are encrypted and decrypted utilizing Case 0. As another example, before encrypting or decrypting a packet, message or other quantity of data, the time is checked, and the encryption protocol to be used in that time range is utilized. The process 100 then moves to box 103. If the combination of linear hopping and time-based hopping was not chosen by the encryption hopping software 200, the process 100 moves to box 116 as described above.

In box 116, if none of the previous types of encryption hopping have been chosen by the encryption hopping software 200, the encryption hopping software 150 chooses another type of encryption hopping, any combination of different types of encryption hopping, or no encryption hopping. As one example, the encryption hopping software 150 may choose linear hopping on its own. As another example, the encryption hopping software 150 may choose date-based hopping on its own. As another example, the encryption hopping software 150 may choose time-based hopping on its own. As another example, the encryption hopping software 150 may choose any combination of hopping described above. As another example, the encryption hopping software 150 may choose spread-spectrum transmission of encrypted data without hopping.

The process then returns to box 103, where the encryption hopping software 150 chooses the type of encryption hopping to use for the next packet or batch of encrypted data. Once a type of encryption hopping has been selected, the encryption hopping software 150 may continue to utilize it. Optionally, the type of encryption hopping may change from time to time to provide additional security. One way in which the use of encryption hopping can defeat attacks, even by a quantum computer, is that all packets transmitted from a transmitter 200 to a receiver 300 look the same to an attacker, even after a change in encryption caused by encryption hopping. That is, all packets are the same length, and all packets are a combination of binary ones and zeros, such that it is impossible for an attacker to determine immediately that the encryption protocol used to encrypt those packets has changed. The changes in encryption are perceived as erratic and irregular to an attacker, but to the users, the changes are expected and known. In this way, even a quantum computer cannot intercept and decode all messages exchanged between a transmitter 200 and receiver 300 utilizing the encryption method 100.

The message transmitted with any of the hopping and/or spread-spectrum approaches described above may be, or may include, a quantum key for use in quantum cryptography. Due to the nature of quantum systems, it is impossible to copy data encoded in a quantum state. If the data encoded in a quantum state is tampered with in any way, the quantum state will change due to a wave-function collapse as a result of the no-cloning principle (the principle that it is impossible to create an independent and identical copy of an arbitrary unknown quantum state). The most prevalent example of quantum cryptography is quantum key distribution (QKD), which involves the previously mentioned quantum mechanical phenomena to create a secure communication method. QKD superposes or entangles a quantum state that is then shared between the two parties attempting secure communication. The primary useful property of QKD is it enables two communicating parties to detect the intrusion of a third party attempting to access the key. Utilizing quantum superposition or entanglement and the transmission of quantum information, one can establish a secure line such that any third party trying to steal the key would have to measure the encoded quantum state of the key, thereby introducing detectable anomalies into the now collapsed quantum system. No vital information is shared between the two users until the key (i.e., the quantum state) is received by both parties without evidence of tampering. QKD typically doesn't encrypt the actual data, but rather allows users to securely distribute classical keys which can then be used for encrypted communication.

The main drawback to QKD is that, similar to conventional public key distributions, it usually relies on the use of authenticated classical communication channels. In the context of modern cryptography, having an authenticated classical channel means that one has either already exchanged a symmetric key of sufficient length or public keys of sufficient security level. Applying encryption hopping to the classical communication method inherent in QKD, in combination with the additional security ingrained in the shared quantum state, would give rise to an even more secure communication channel than either used individually. For example, after QKD has been utilized to securely distribute classical keys used for encrypted communications, the encryption hopping process 100 may be utilized in the transmission of data. Encryption hopping in any of the forms described above with regard to the encryption hopping process 100 may be performed after the initial exchange of keys via QKD. As another example, any of the forms of encryption hopping as described in the context of the encryption hopping process 100 may be used to trigger the distribution of new keys via QKD. For example, in box 118, the encryption hopping software 150 may perform linear hopping in combination with date-based hopping time-based hopping to trigger the distribution of new keys via QKD. As another example, in box 120, the encryption hopping software 150 may perform date-based hopping and time-based hopping to trigger the distribution of new keys via QKD. As another example, in box 122, the encryption hopping software 150 may perform linear hopping and time-based hopping to trigger the distribution of new keys via QKD. As another example, in box 116, the encryption hopping software 150 may perform any type of encryption hopping or any combination of different types of encryption hopping to trigger the distribution of new keys via QKD.

Hardware

Figure 3:
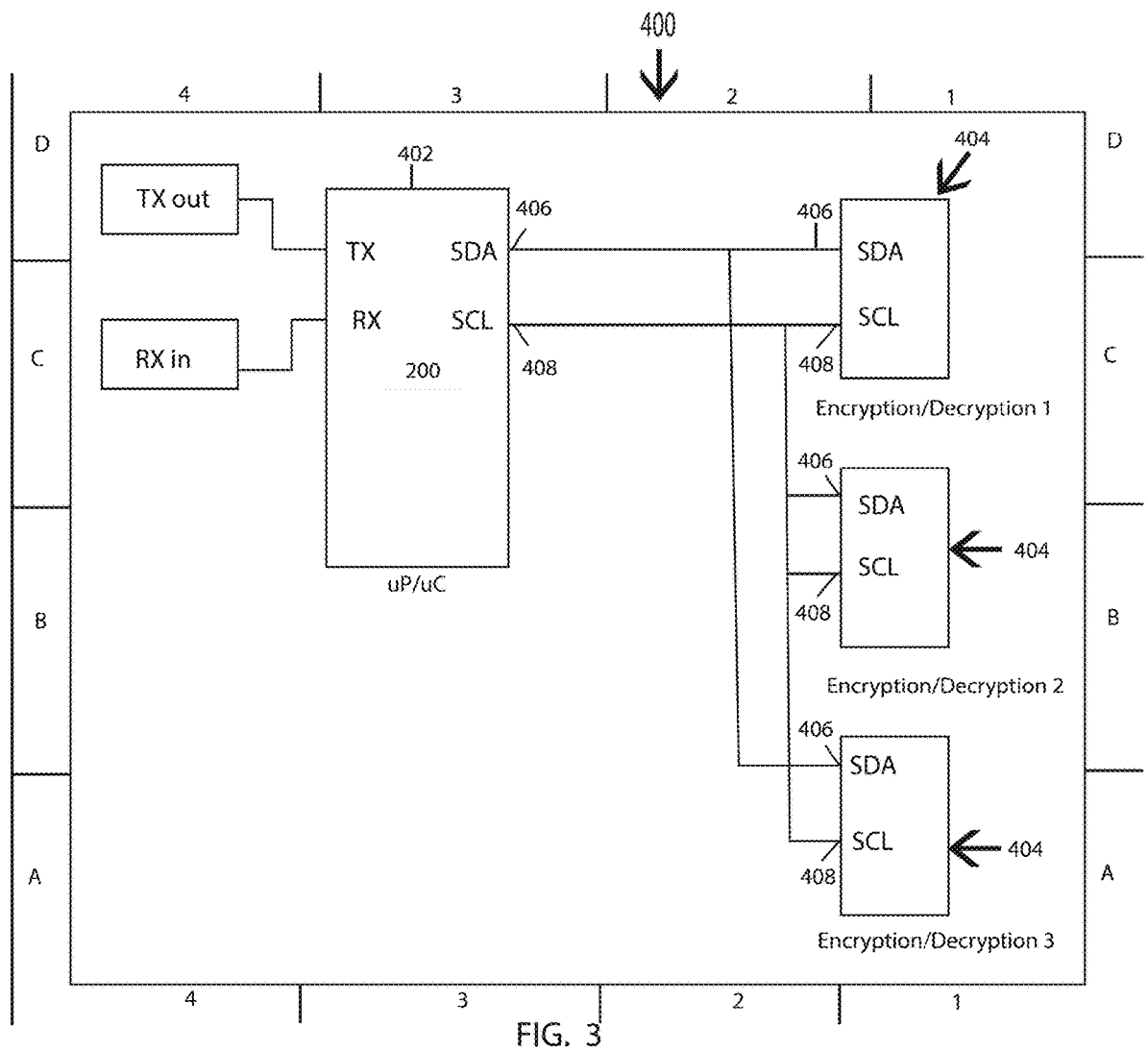
FIG. 3 is a schematic view of a controller and a plurality of encryption processors.

Referring also to FIG. 3, at least part of the process 100 above may be implemented in hardware. Unless otherwise indicated below, the steps of the process 100 above and the actions of the encryption hopping software 150 operate similarly to the manner in which they are described above. The encryption hopping software 150 runs on a controller 402, which may be located within a larger hardware component 400. Two or more encryption microprocessors 404 may be included within the component 400. Each encryption microprocessor 404 includes at least one encryption protocol stored within. Multiple encryption protocols may be implemented in Verilog or HDL languages, and stored in a single encryption microprocessor 404. According to other embodiments, a single encryption protocol is stored in each encryption microprocessor 404. The encryption microprocessors 404 may be integrated circuits, field-programmable gate arrays (FPGAs), microcontrollers, or any other suitable hardware. The encryption microprocessors 404 are configured to store one or more encryption protocols, and also to perform encryption and/or decryption of data transmitted to those encryption microprocessors 404.

The encryption microprocessors 404 are connected to the controller 402 via physical connections such as wires or fiber optic cables, and via data protocols such as the I2C protocol, although other data protocols and interfaces may be utilized if desired. The I2C bus carries two signals: the data (SDA) and clock (SCL) lines. The controller 402, and the encryption microprocessors 404, each may include a first physical pin 406 to connect to the SDA line and a second physical pin 408 to connect to the SCL line. According to other embodiments, a different physical connection and/or data protocol may be used to connect the controller 402 to the one or more encryption microprocessors 404. For example, the data protocol utilized may be Transmission Control Protocol (TCP), User Datagram Protocol (UDP), Internet Control Message Protocol (ICMP), non-return-to-zero (NRZ), Controller Area Network (CAN) bus, or any other data protocol that allows those components to communicate.

The encryption process 100 described above may be performed with the hardware component 400. The encryption hopping software 150 may run on the controller 402, and selects the type of encryption hopping performed in the encryption process 100. Because the encryption microprocessors 404 are configured to store one or more encryption protocols, and also to perform encryption and/or decryption of data transmitted to those encryption microprocessors 404, the encryption and decryption of the encryption process 100 is performed by the encryption microprocessors 404.

The hardware component 400 may be configured to transmit data across multiple channels. For example, the BLUETOOTH® Low Energy protocol uses frequency hopping within the frequency domain 2.402-2.480 GHz, which is divided into 40 channels, each with a bandwidth of 2 MHz for Channels 0-39. The BLUETOOTH® protocol uses frequency-hopping spread spectrum technology; it divides transmitted data into packets, and transmits each packet on a designated channel. Each channel may be associated with a specific encryption protocol. For example, data transmitted by the hardware component 400 on Channel 0 may use encryption protocol Case 0, data transmitted on Channel 1 may use encryption protocol Case 1, and so on. The number of encryption protocols may be less than the number of channels, in which case groups of two or more channels may use one encryption protocol. The receiver 300 then decrypts the communication in the same manner, using encryption protocol Case 0 to decrypt packets on Channel 0, encryption protocol Case 1 to decrypt packets on Channel 1, and so on. Encryption hopping as described above may be performed on all of the channels collectively. For still further security, a different form of encryption hopping may be performed on each channel or on a subset of channels.

According to some embodiments, null data may be transmitted over one or more channels, and actual data to be decrypted is transmitted over one or more other channels. The channel number or numbers containing actual data may be transmitted from the hardware component 400 to the receiver 300 as part of the data that is encrypted. The receiver 300 may then decrypt only the channel or channels carrying actual data to be communicated.

Use Cases

Figure 4:
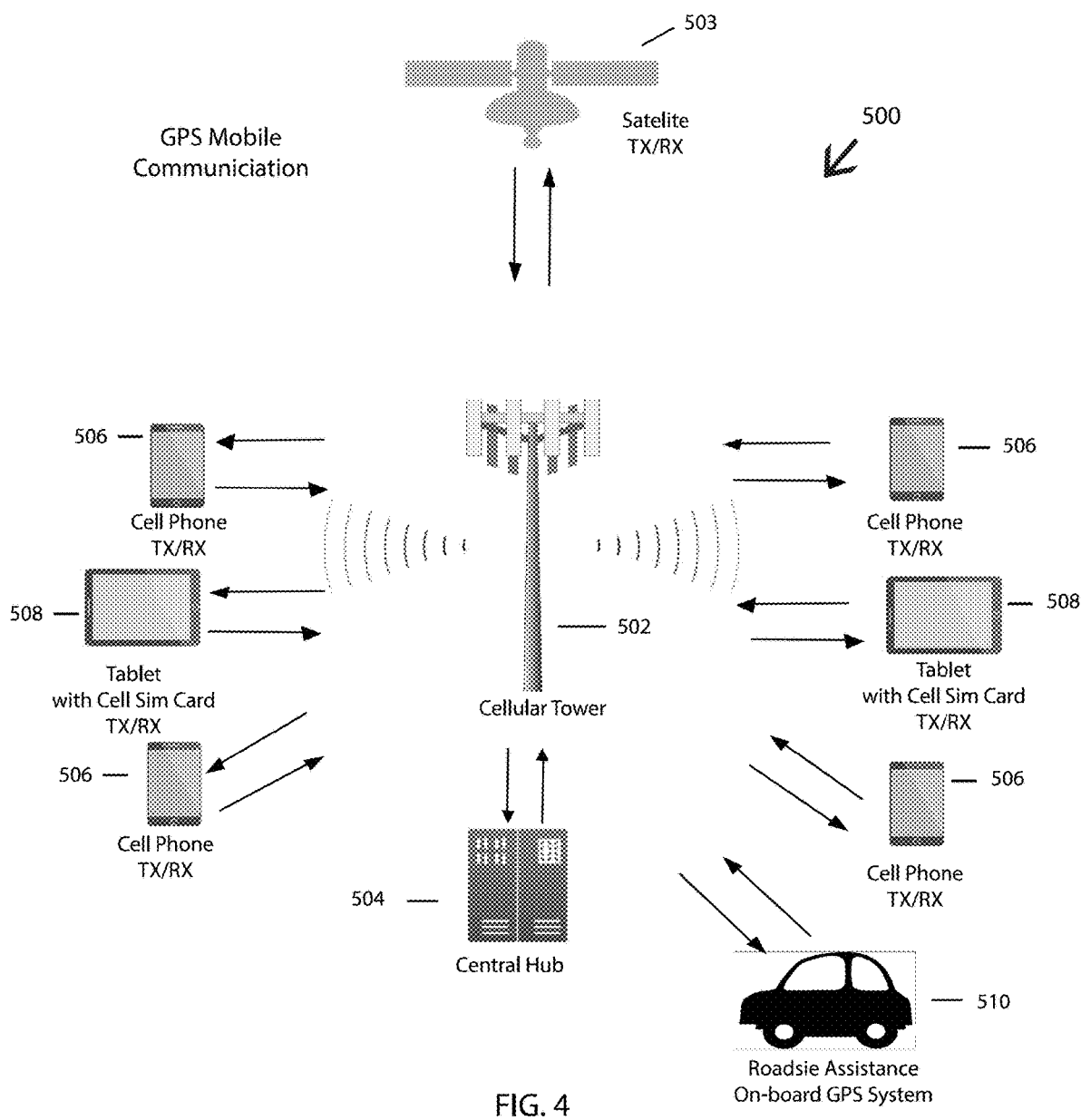
FIG. 4 is a schematic view of a cellular network in which the process of FIG. 1 and/or the devices of FIG. 2 may be utilized.

Referring also to FIG. 4, use cases for the process 100, device 210 and receiver 300 are shown in the context of a cellular network 500, such as a 4G, 5G, or other network used for the transmission of data. The cellular network 500 includes cellular towers 502 and one or more central hubs 504. Optionally, the cellular network 500 may include one or more satellites 503 in Earth orbit used to transmit data. Thus, each device described in the context of the cellular network 500 of FIG. 4, utilizing the services of the cellular towers 502 and central hub(s) 504 may be considered to be either a transmitting device 210 or a receiver 300, and any of those devices may utilize the process 100 for transmitting encrypted data as either a transmitting device 210 or a receiver 300. The cellular network 500 may be utilized by a cell phone 506, a tablet 508 with a cellular sim card, an automobile 510 or other vehicle, and/or a roadside onboard assistance system in that automobile 510 or other vehicle. Communications between any of the devices that utilize the cellular network 500 may be encrypted using the process 100, implemented on the devices themselves, without the need for the cellular network 500 to perform any tasks related to encryption; the cellular network 500 simply transmits encrypted data between devices.

Figure 5:
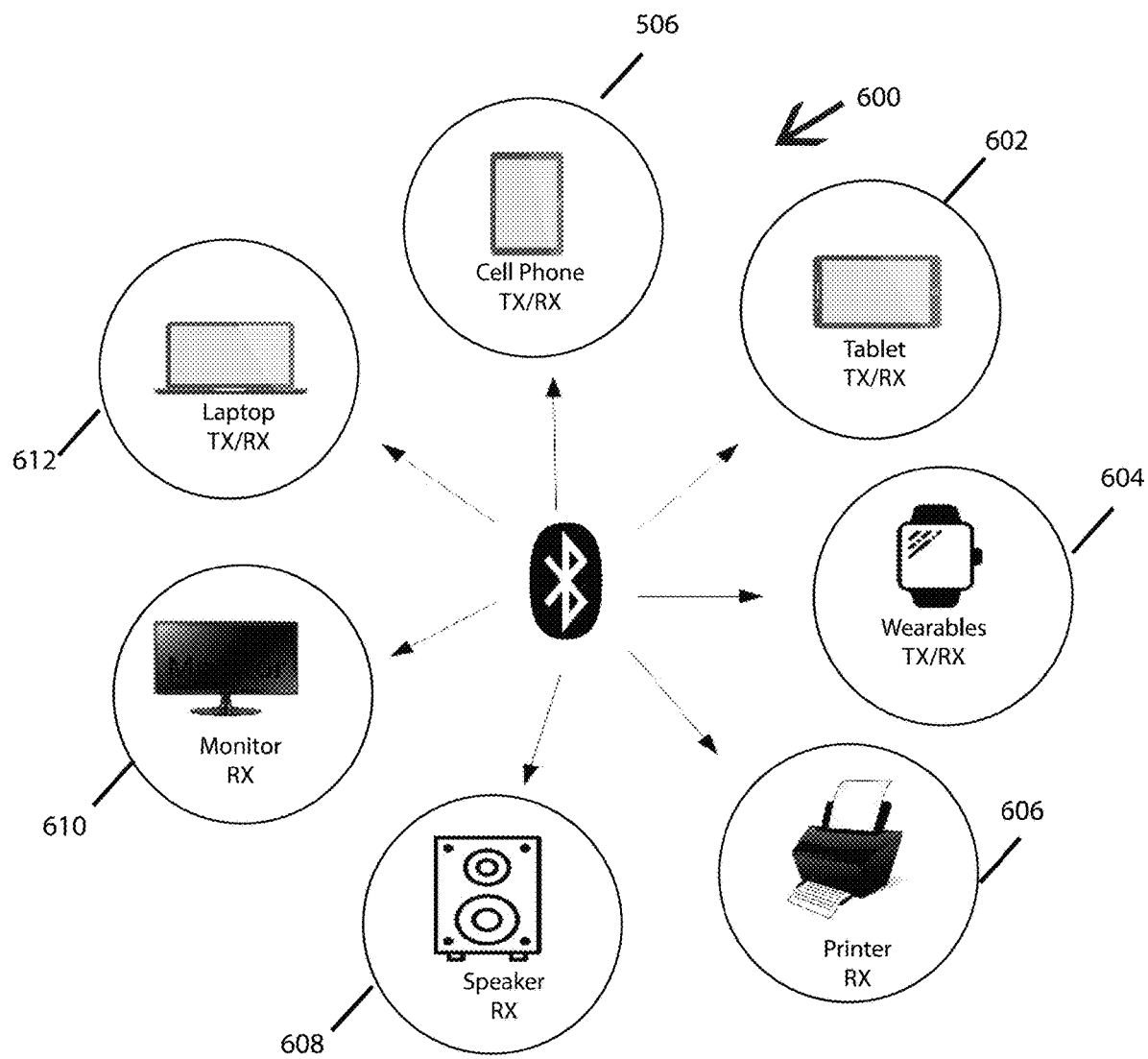
FIG. 5 is a schematic view of a BLUETOOTH® wireless network in which the process of FIG. 1 and/or the devices of FIG. 2 may be utilized.

Referring also to FIG. 5, use cases for the process 100, device 210 and receiver 300 are shown in the context of a short-range wireless network 600 such as a BLUETOOTH® wireless network or WI-FI® wireless network. Each device described in the context of the wireless network 600 of FIG. 5 may be considered to be either a transmitting device 210 or a receiver 300, and any of those devices may utilize the process 100 for transmitting encrypted data as either a transmitting device 210 or a receiver 300. The wireless network 600 may be utilized by a cell phone 506, a tablet 602, a wearable device 604 such as a smart watch, a printer 606, one or more speakers 608, a monitor 610, and/or a laptop 612. Communications between any of the devices that utilize the wireless network 600 may be encrypted using the process 100, implemented on the devices themselves, without the need for the wireless network 600 to perform any tasks related to encryption; the wireless network 600 simply transmits encrypted data between devices.

Figure 6:
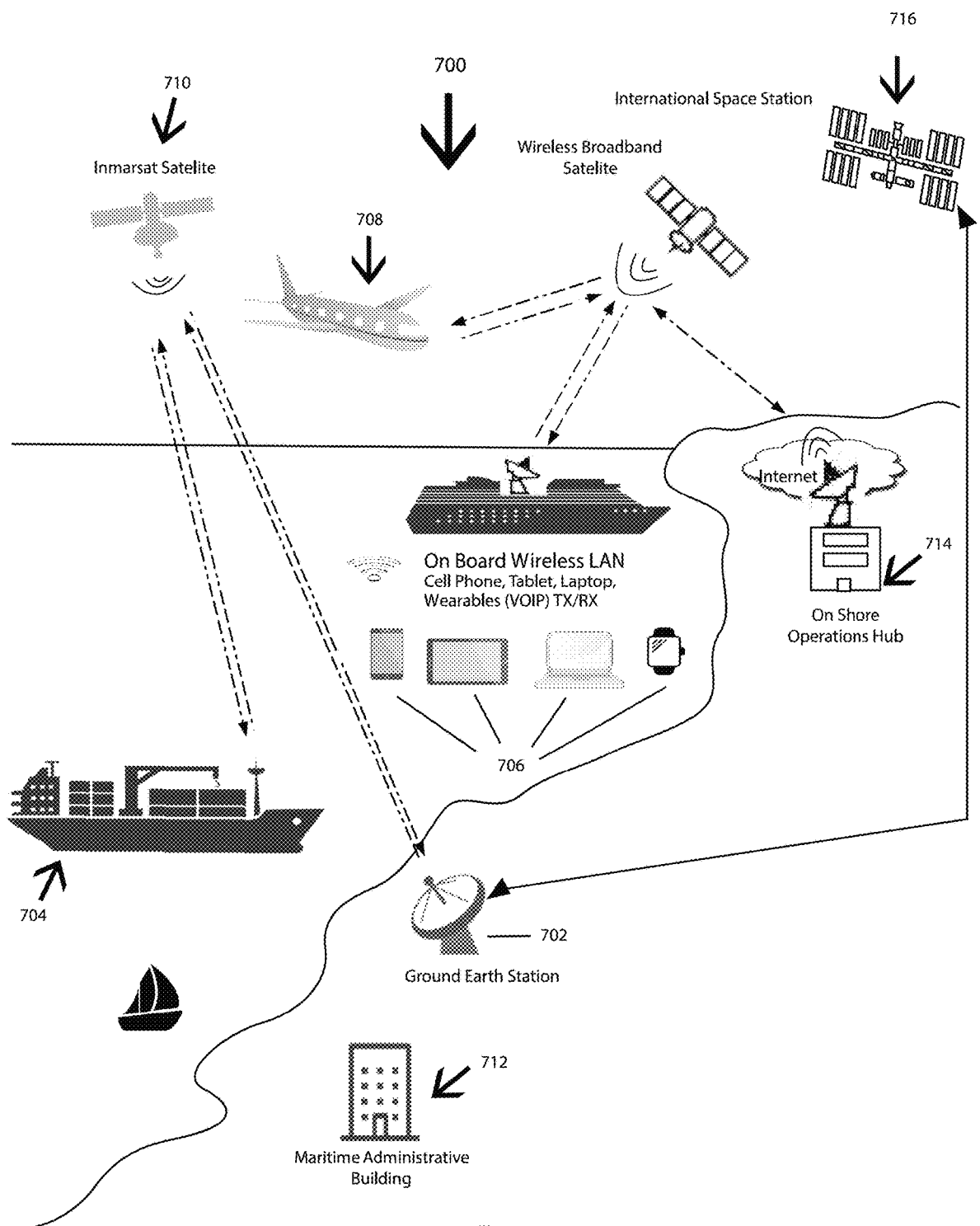
FIG. 6 is a schematic view of communications between ground stations and a ship, airplane or spacecraft in which the process of FIG. 1 and/or the devices of FIG. 2 may be utilized.

Referring also to FIG. 6, use cases for the process 100, device 210 and receiver 300 are shown in the context of a long-range communications network 700 used to connect one or more ground stations 702 to vehicles at sea, in the air and/or in space. Each device described in the context of the long-range communications network 700 of FIG. 6 may be considered to be either a transmitting device 210 or a receiver 300, and any of those devices may utilize the process 100 for transmitting encrypted data as either a transmitting device 210 or a receiver 300. The long-range communications network 700 may be utilized by a ship 704, devices 706 aboard a ship 704, an airplane 708, a satellite 710, a maritime administration building 712, an operations hub 714, and/or a crewed or uncrewed spacecraft or space station 716 such as the International Space Station, whether in Earth orbit, lunar orbit, or elsewhere. Communications between any of the devices that utilize the long-range communications network 700 may be encrypted using the process 100, implemented on the devices themselves, without the need for the long-range communications network 700 to perform any tasks related to encryption; the long-range communications network 700 simply transmits encrypted data between devices.

The use cases described above with regard to FIGS. 4-6 are exemplary and not limiting; the process 100, transmitting device 210 and receiver 300 may be used in other networks, and may encompass other devices. For example, the transmitting device 210 and/or receiver 300 may be devices included in the "internet of things" (JOT); that is, they may be devices that include sensors or other hardware that interface with other devices and systems over the Internet or other wireless communication system.

As used in this document, and as customarily used in the art, the word "substantially" and similar terms of approximation refer to normal variations expected in manufacturing and communications; for example, from normal variations in network and communications properties, and in the measurement of such variations.

While the invention has been described in detail, it will be apparent to one skilled in the art that various changes and modifications can be made and equivalents employed, without departing from the present invention. It is to be understood that the invention is not limited to the details of construction, the arrangements of components, and/or the method set forth in the above description or illustrated in the drawings. Statements in the abstract of this document, and any summary statements in this document, are merely exemplary; they are not, and cannot be interpreted as, limiting the scope of the claims. Further, the figures are merely exemplary and not limiting. Topical headings and subheadings are for the convenience of the reader only. They should not and cannot be construed to have any substantive significance, meaning or interpretation, and should not and cannot be deemed to indicate that all of the information relating to any particular topic is to be found under or limited to any particular heading or subheading. Therefore, the invention is not to be restricted or limited except in accordance with the claims.

What is claimed is:

1. An apparatus for providing secure communications, comprising:
    a processor;
    memory in electronic communication with said processor;
    an output in electronic communication with said processor; and
    instructions stored in said memory and executable by said processor to cause the apparatus to:
        store a plurality of encryption protocols;
        store at least one encryption hopping protocol;
        select at least one encryption hopping protocol;
        encrypt the data according to said selected at least one encryption hopping protocol; and
        transmit data from said output utilizing the selected at least one encryption hopping protocol, without transmitting an encryption key associated with said data.

2. The apparatus of claim 1, further comprising a clock in electronic communication with said processor.

3. The apparatus of claim 1, further comprising an input in electronic communication with said processor.

4. The apparatus of claim 1, further comprising at least one encryption microprocessor in electronic communication with said processor.

5. The apparatus of claim 4, wherein said electronic communication between said processor and said at least one encryption microprocessor is performed via an I2C bus.

6. The apparatus of claim 4, wherein each said encryption microprocessor stores at least one said encryption protocol, and performs at least one of encryption and decryption of data received thereby.

7. The apparatus of claim 4, wherein at least one said encryption microprocessor is an FPGA.

8. The apparatus of claim 1, wherein multiple channels are transmitted through said output, and wherein at least one channel is encrypted with a different encryption protocol than at least one other channel.

9. The apparatus of claim 8, wherein each said channel is encrypted with a different encryption protocol.

10. The apparatus of claim 1, wherein said output further comprises a photon generator.

11. A method for secure communication of data between two or more devices, comprising:
    storing a plurality of encryption protocols;
    storing at least one encryption hopping protocol;
    selecting at least one said encryption hopping protocol;
    encrypting data according to said selected encryption hopping protocol; and
    transmitting data from one device to at least one other device utilizing said selected encryption hopping protocol, without transmitting an encryption key associated with said data.

12. The method of claim 11, wherein said selecting comprises selecting at least linear hopping.

13. The method of claim 11, wherein said selecting comprises selecting at least date-based hopping.

14. The method of claim 11, wherein said selecting comprises selecting at least time-based hopping.

15. The method of claim 11, wherein said selecting comprises selecting linear hopping and date-based hopping.

16. The method of claim 11, wherein said selecting comprises selecting date-based hopping and time-based hopping.

17. The method of claim 11, wherein said selecting comprises selecting linear hopping and time-based hopping.

18. The method of claim 11, further comprising synchronizing time between the devices.

19. The method of claim 11, wherein said transmitting data comprises quantum key distribution.

20. A non-transitory computer-readable medium storing code for performing encryption hopping, the code comprising instructions executable by a processor to:
    store a plurality of encryption protocols;
    store at least one encryption hopping protocol;
    select at least one encryption hopping protocol;
    receive data to be encrypted;
    encrypt the data according to said selected encryption hopping protocol; and
    transmit data utilizing the selected encryption hopping protocol, without transmitting an encryption key associated with said data.

* * * * *